Oct. 12, 1948.

H. J. McCREARY 2,451,344

GRID CONTROLLED RECTIFIER CIRCUIT

Filed Feb. 8, 1945.

*INVENTOR.*
HAROLD J. MC CREARY

BY

ATTORNEY

Oct. 12, 1948.    H. J. McCREARY    2,451,344
GRID CONTROLLED RECTIFIER CIRCUIT
Filed Feb. 8, 1945    2 Sheets-Sheet 2
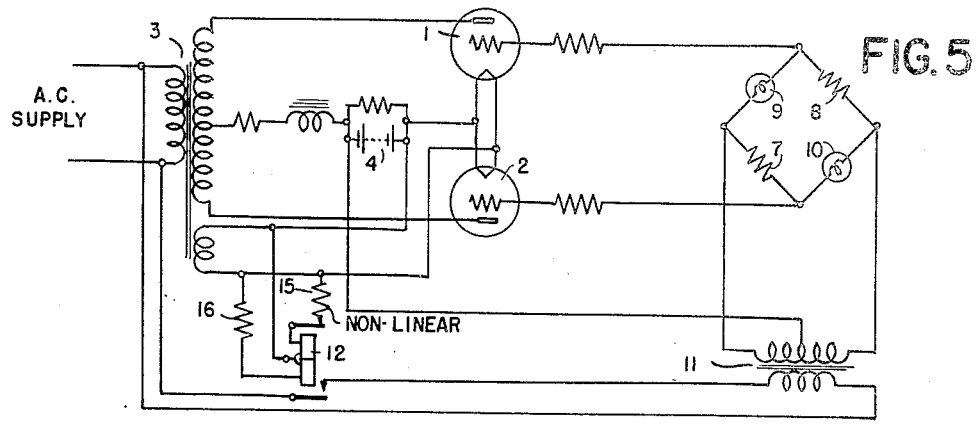
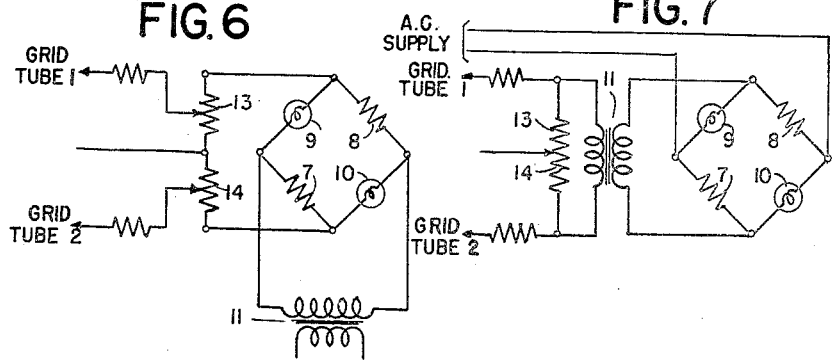
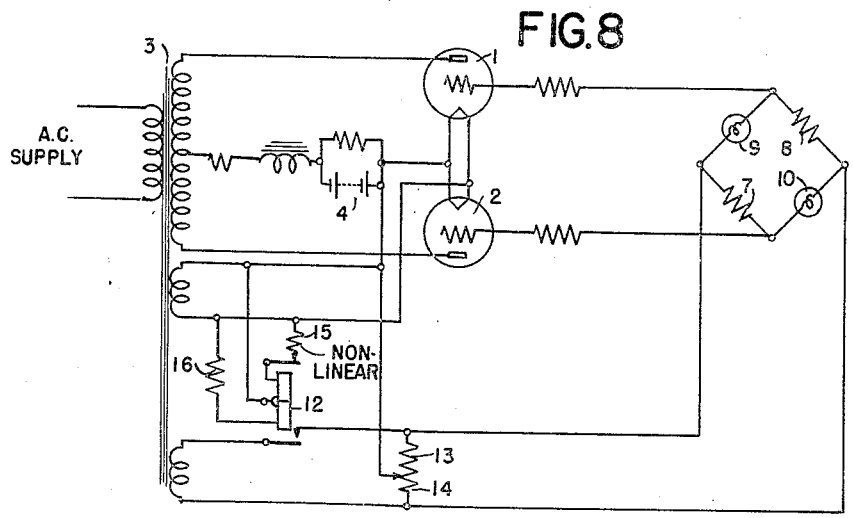
*INVENTOR.*
HAROLD J. MC CREARY
BY
*Chas. Fr. Conby.*
ATTORNEY Patented Oct. 12, 1948

2,451,344

UNITED STATES PATENT OFFICE 2,451,344

GRID-CONTROLLED RECTIFIER CIRCUIT

Harold J. McCreary, Lombard, Ill., assignor to Automatic Electric Laboratories, Inc., Chicago, Ill., a corporation of Delaware Application February 8, 1945, Serial No. 576,817

1 Claim. (Cl. 315—271)

The present invention relates in general to rectifier circuits employing grid controlled gaseous discharge tubes and in particular to improvements in voltage control circuits therefor.

Various methods for regulating the output voltage of converters employing rectifier tubes of the gas filled grid controlled type have been proposed, one of which methods is to impress on the control grid of the rectifier tube an alternating voltage which is in phase with alternating voltage applied to the anode of the tube, and to superimpose a variable direct control voltage on the alternating voltage impressed on the control grid, whereby the ignition time of the tube is controlled by the magnitude of the direct current control voltage. While such regulating systems are capable of maintaining the output voltage of a rectifier constant with a variable load, the output voltage is still a function of the alternating current supply voltage.

The principal object of the present invention is to provide an improved control circuit, for a rectifier employing gas filled grid controlled tubes, which will maintain the output voltage constant for varying input voltages and varying loads.

A further object of the invention is to provide an improved voltage control circuit, for a rectifying system employing gas filled grid controlled tubes, which will compensate for variations in the critical grid potential of the rectifier tubes produced by variations in the alternating current input voltage.

A still further object of the invention is to provide an improved regulated rectifier circuit that is simple and economical to construct.

Another object of the invention is to provide an improved protective arrangement for preventing the rectifier tubes from igniting until the cathodes have had time to reach a safe operating temperature.

Other objects of the invention will become apparent upon a further perusal of the specification taken in conjunction with the accompanying drawing, in which:

Fig. 1 illustrates in the form of a schematic diagram a rectifier system constructed in accordance with the invention.

Figs. 2, 3, and 4 illustrate in graphical form the relationships between the various voltages in the circuit of Fig. 1.

Fig. 5 shows a modified form of the circuit of Fig. 1.

Fig. 6 shows one manner in which the circuit of Fig. 1 may be modified.

Fig. 7 shows another manner in which the circuit of Fig. 1 may be modified.

Fig. 8 shows still another modification of the circuit of Fig. 1.

In any gaseous discharge tube the critical grid potential at which a discharge between the cathode and anode will be initiated is a function of the anode voltage and the cathode temperature. For this reason the regulated rectifier systems previously known which compare the output voltage with the voltage of an auxiliary battery are also subject to variation in output voltage when the input voltage varies. In addition, gradual changes in the voltage of the auxiliary battery produce corresponding changes in the output voltage. The variations which are due to changes in supply voltage could be eliminated by means of an alternating current voltage regulator in the supply line circuit. However, the use of such a regulator would greatly increase the cost of the rectifier system since the regulator would have to handle the full input power of the system. In accordance with the present invention, means are provided for deriving an alternating control voltage which may be substantially constant or may vary slightly with changes in the supply voltage in a predetermined manner. This alternating control voltage is impressed between the control grids and cathodes of the rectifier tubes in series with the direct current output voltage. Thus for a given supply voltage, the ignition time of the tubes is controlled by the difference between the output voltage and the control voltage. If the critical grid potential changes to an appreciable extent when the supply voltage varies, the alternating control voltage may be made to vary in a complementary way so that the desired relation between ignition time and output voltage will be maintained. The control voltage is obtained from the alternating current supply by means of a bridge circuit having ballast lamps in two of the bridge arms and resistors in the other two bridge arms.

A time delay relay is provided which connects the supply voltage to the bridge circuit a predetermined time interval after power is applied to the system. During this interval the control grids of the rectifier tubes are maintained more negative than the critical value by the battery in the output circuit, thus preventing ignition of the tubes. The time delay relay comprises a conventional alternating current relay having two windings connected differentially to a winding on an input transformer which supplies the required cathode and anode voltages for the rectifier tubes.

One of the relay windings is connected in series with a linear resistance and the other relay winding is connected in series with a non-linear resistance. When the input transformer is energized the two windings of the relay are initially energized equally preventing operation of the relay armature. As the non-linear resistance heats up its resistance increases thus decreasing the current in its associated winding and permitting operation of the relay.

Figure 1:
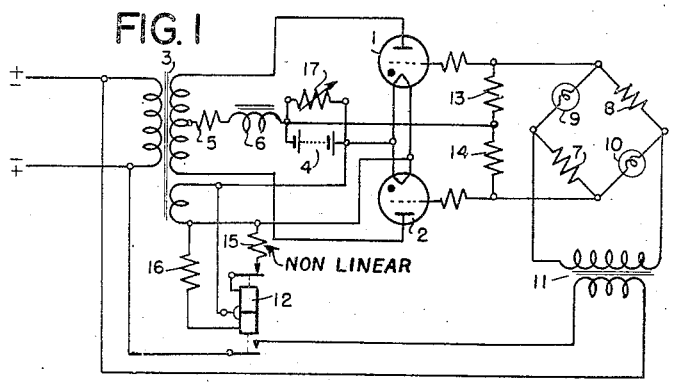

Referring now to Fig. 1, two grid controlled rectifier tubes 1 and 2 are shown. The anodes of these tubes are connected to opposite ends of a center-tapped secondary winding on an input transformer 3. The cathodes of the tubes are connected to another secondary winding on the transformer 3. The primary winding of transformer 3 is connected to a source of alternating current. The center tap of the upper secondary winding is connected to the negative terminal of a battery 4 in series with a resistor 5 and a filter choke 6. The positive terminal of battery 4 is connected to the cathodes of tubes 1 and 2. The terminals of battery 4 are also connected to a load circuit 17. The control grids of tubes 1 and 2 are connected across one diagonal of a bridge circuit comprising resistors 7 and 8 and ballast lamps 9 and 10. The other diagonal of the bridge is connected to the secondary winding of an auxiliary transformer 11 having its primary winding connected to the supply circuit in series with contacts of relay 12. The control grids of tubes 1 and 2 are connected through resistors 13 and 14 to the negative battery terminal. The upper winding of relay 12 is connected to one of the secondary windings of transformer 3 in series with a non-linear resistance 15 and the lower relay winding is connected in series with a fixed resistance 16.

Figure 2:
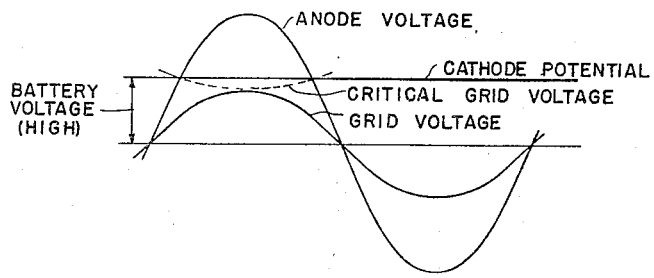
Figure 3:
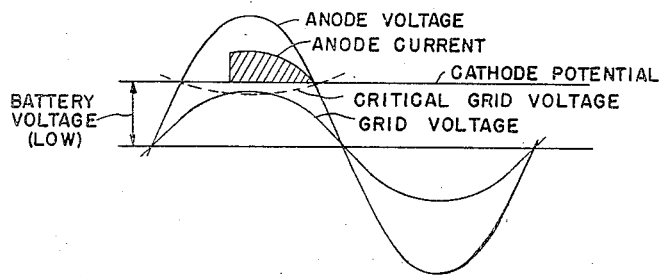

When the primary winding of transformer 3 is energized, an alternating voltage is impressed on the anodes of tubes 1 and 2. The tubes are prevented from firing at this time by the negative voltage impressed on their control grids by battery 4. The two windings of relay 12 are energized in multiple with the cathodes of tubes 1 and 2 through resistances 15 and 16. The magnitudes of resistances 15 and 16 are equal at room temperatures thus causing equal and opposite magneto motive forces to be developed in the two windings of relay 12. The current flowing through resistance 15 increases its temperature and causes its resistance to rise. After a time interval long enough to permit the cathodes of tubes 1 and 2 to reach a safe operating temperature the value of resistance 15 will have changed sufficiently to permit relay 12 to operate. When relay 12 operates it opens the circuit to its upper winding thus allowing resistor 15 to return to room temperature. Relay 12 also connects the supply voltage to the primary winding of transformer 11 thus causing an alternating voltage to be impressed across resistors 13 and 14 in series. One half of this voltage is applied between the control grid and cathode of tube 1 in series with battery 4, and the other half is applied between the control grid and cathode of tube 2 in series with battery 4. The polarity of the windings of transformer 11 and the relative magnitudes of resistors 7 and 8 and ballast lamps 9 and 10 are such that the junction point between the elements 8 and 9 is positive with respect to the junction point between elements 7 and 10 when the anode of tube 1 is positive. Thus the grid-cathode voltage of each rectifier tube consists of a direct current component equal to the voltage of battery 4 upon which is superimposed an alternating current component which is in phase with the anode voltage and is equal to one half the voltage appearing across the output of the bridge circuit. The turns-ratio of transformer 11 is such that the peak value of the alternating current component of the grid-cathode voltage is equal to the nominal battery voltage less the negative peak value of the critical grid voltage. Therefore when the battery voltage is above the nominal value, as illustrated in Fig. 2, the grid voltage never reaches the critical value and the rectifier tubes remain inactive. If the battery voltage falls below the nominal value, due either to a gradual discharge of battery 4 or to a sudden increase in load, the grid voltage will reach the critical value at some time during the first half of the half cycle when the anode is positive, as illustrated in Fig. 3. If the battery voltage is only slightly below the nominal value each tube will fire at the middle of the half cycle when its anode is positive. Once either tube has fired it remains ionized for the remainder of the half cycle since the grid loses control once the tube becomes ionized.

If the supply voltage increases, the anode voltage of tubes 1 and 2 increases and their cathode temperatures increase. Both of these changes will tend to lower the critical grid voltage and would normally cause the tubes to fire when the battery voltage is higher than the nominal value. The magnitude of the change in critical grid voltage produced by a given change in input voltage is a function of the tube structure. In some cases this change may be a negligible fraction of the total battery voltage. In other cases a substantial change in critical grid voltage may occur which can be offset by choosing values of the ballast lamps 9 and 10 and resistors 7 and 8 which will produce a complementary change in the alternating component of the grid voltage. In most cases the change in the critical grid voltage will be only a small percentage of the total voltage across the output of the bridge circuit. The voltage across the bridge circuit output will therefore usually be substantially constant but may change slightly with changes in supply voltage.

Figure 4:
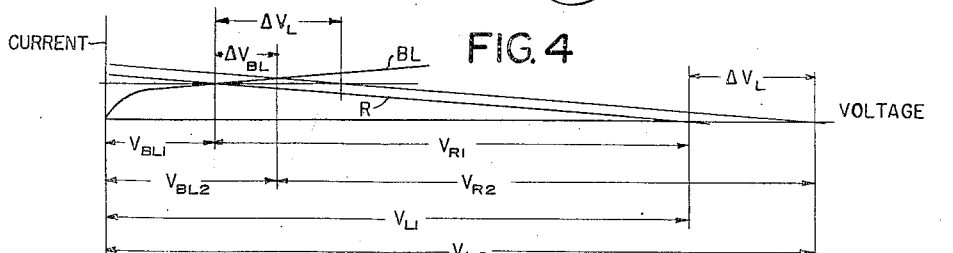

The manner in which the bridge circuit operates to produce the desired relation between the supply voltage and the control voltage is illustrated in Fig. 4. In this figure the curve BL represents the current vs. voltage characteristic of one of the ballast lamps 9 and 10. The line R is the current vs. voltage characteristic of one of the resistors 7 and 8 plotted in the reverse direction to curve BL. Thus for a given supply line voltage $V_{L1}$, the interception of curve BL and line R determines the voltages which will appear across the ballast lamp and the resistance when they are connected in series. These voltages are $V_{BL1}$ for the ballast lamp and $V_{R1}$ for the resistance. If the supply line voltage $V_{L1}$ is increased an amount $\Delta V_L$ to the value $V_{L2}$, the voltage across the ballast lamp $V_{BL1}$ will be increased to a new value $V_{BL2}$ by an amount $\Delta V_{BL}$ which depends upon the relative slopes of line R and curve BL. It should be apparent from the geometry of the construction that if the slope of curve BL over the working range is the same as the slope of line R, that $\Delta V_{BL}$ will be equal to one half of $\Delta V_L$. When this is true the difference between $V_R$ and $V_{BL}$ is a constant. It is this difference voltage that appears across resistors 13 and 14 in Fig. 1. If it is necessary to compensate for changes in the critical grid potential of the rectifier tubes, the value of the resistance in series with each ballast lamp may be made such that the slope of its current vs. voltage characteristic is less than that of the current vs. voltage characteristic of the ballast lamp in the working range, whereby the output voltage of the bridge circuit can be made to decrease with an increase in supply voltage to compensate for the change in the critical grid voltage of the rectifier tubes.

It should be apparent that resistors 13 and 14 could be omitted if the negative battery terminal was connected to the mid-point of the secondary winding of transformer 11 as indicated in Fig. 5. However, under some conditions it may be preferable to use a higher voltage across the ballast lamps than is required for grid control purposes in order to operate the ballast lamps over a particular portion of their characteristic. In this case the grids of tubes 1 and 2 can be connected to taps on resistors 13 and 14, respectively, so that only a portion of the output voltage of the bridge circuit is used as indicated in Fig. 6. It may also be desirable to connect the input terminals of the bridge to the supply circuit and to connect transformer 11 between the output of the bridge and the grids of tubes 1 and 2 as indicated in Fig. 7. Another alternative to the circuit arrangement shown would be to replace transformer 11 with an additional winding on transformer 3 as indicated in Fig. 8. With this arrangement the make contacts of relay 12 would be connected in series with the additional winding and the bridge circuit.

It should be understood that numerous modifications may be resorted to without departing from the true spirit and scope of the invention as defined in the appended claim.

What is claimed is:

In a converter, a battery, a load circuit connected across said battery, said load circuit requiring direct current of varying strength at substantially constant direct current potential, a source of alternating current potential which varies appreciably in magnitude, a thermionic gas-filled tube having a cathode, a control grid, and an anode, an anode circuit including said battery and circuit means for inducing from said source an alternating current potential between said cathode and said anode, a Wheatstone bridge circuit in which each branch comprises a linear and a non-linear resistor connected in series, a control grid circuit connecting said control grid to one diagonal of said bridge circuit and also to said battery, the connection to said battery and to said control grid circuit biasing said grid negatively with respect to said cathode, means for inducing from said source an alternating current potential across the other diagonal of said bridge circuit to thereby superimpose upon the direct current bias of said control grid an alternating current potential, the magnitude of the alternating current potential applied to said control grid from said bridge circuit varying inversely with the magnitude of the alternating current potential of said source, the resultant potential applied to said grid controlling the firing time of said tube and thereby the duration of rectified current flow in said anode circuit during alternate half cycles of the induced alternating current potential, and said controlled rectified current flow maintaining the direct current potential across said load and the battery substantially constant regardless of the variations in said source and in the current requirements of said load.

HAROLD J. McCREARY.

REFERENCES CITED

The following references are of record in the file of this patent:

UNITED STATES PATENTS

| Number | Name | Date |
|---|---|---|
| 959,594 | Jackson et al. | May 31, 1910 |
| 1,276,589 | Steinmetz | Aug. 20, 1918 |
| 1,717,563 | Hull | June 18, 1929 |
| 1,748,862 | Brown | Feb. 25, 1930 |
| 1,917,146 | Nixdorff | July 4, 1933 |
| 1,986,627 | Edwards | Jan. 1, 1935 |
| 2,012,573 | Long | Aug. 27, 1935 |
| 2,030,113 | Lyle | Feb. 11, 1936 |
| 2,034,881 | Scheer | Mar. 24, 1936 |
| 2,069,737 | Beetem | Feb. 9, 1937 |
| 2,095,772 | Steenbeck | Oct. 12, 1937 |
| 2,128,562 | Renner | Aug. 30, 1938 |
| 2,274,013 | Swenson | Feb. 24, 1942 |
| 2,340,083 | Schnarz | Jan. 25, 1944 |
| 2,339,125 | Winter | Jan. 11, 1944 |
| 2,378,311 | McCreary | June 12, 1945 |

FOREIGN PATENTS

| Number | Country | Date |
|---|---|---|
| 382,565 | Great Britain | Oct. 27, 1932 |
| 443,793 | Germany | May 11, 1927 |

OTHER REFERENCES

"Electron Tubes in Industry," by K. Henney, 1934 (copy in Div. 54).